United States Patent [19]

Woodfill

[11] 4,009,422

[45] Feb. 22, 1977

[54] LIGHTNING ARRESTER CONSTRUCTION

[75] Inventor: Ernest L. Woodfill, Minneapolis, Minn.

[73] Assignee: Buckbee-Mears Company, St. Paul, Minn.

[22] Filed: July 21, 1975

[21] Appl. No.: 597,594

[52] U.S. Cl. .................................. 361/120; 361/129

[51] Int. Cl.² ........................................... H02H 3/22

[58] Field of Search .................. 317/16, 61, 62, 69; 337/17, 18, 20, 28, 32, 33, 34

[56] References Cited

UNITED STATES PATENTS

| | | | |
|---|---|---|---|
| 772,190 | 10/1904 | Thomas | 317/62 X |
| 2,355,490 | 8/1944 | Wayman | 317/61 |
| 2,830,216 | 4/1958 | Laurin | 317/62 X |
| 2,875,366 | 2/1959 | Bauman et al. | 317/69 X |
| 3,431,452 | 3/1969 | Hale et al. | 317/61 X |
| 3,522,570 | 8/1970 | Wanaselja | 337/32 X |

*Primary Examiner*—Harry Moose

*Attorney, Agent, or Firm*—Jacobson and Johnson

[57] ABSTRACT

A compact lightning arrester is formed from a cylindrical housing and a plurality of electrodes which are located in a spaced relationship from the housing and are hermetically sealed within the cylindrical housing.

1 Claim, 2 Drawing Figures

LIGHTNING ARRESTER CONSTRUCTION

BACKGROUND OF THE INVENTION

1. Field of the Invention

This invention is directed generally to the field of lightning arresters for protecting electrical signal lines against voltage surges and, more specifically, to an improved compact construction of a failsafe lightning arrester which can protect a plurality of lines.

2. Description of the Prior Art

An article titled "New Gas Tube Protector Technique for Circuits" by C. Bruce Barksdale appeared in TELEPHONY Oct. 17, 1970 and describes in detail the more commonly used means of protecting electrical lines against induced lightning surges. Briefly, this article described the use of a gas filled discharge tube containing three electrodes, one of the electrodes is grounded and the other two electrodes are connected to signal lines, such as two-wire telephone lines. Types of suitable gas-filled discharge tubes and their manner of construction and operation is described in U.S. Pat. Nos. 3,522,570 and 3,535,779 by Wanaselja. Basically, a high voltage electrical impulse such as that induced on telephone lines by nearby lightning, if of a magnitude that equals the ignition or firing threshold of the gas tube, causes the gas in the tube to ionize and, thereby, provide a low resistance electrical path to ground for both lines. This prevents the high surge from reaching the equipment being fed by the signal lines, such as a telephone receiver and transmitter. With telephone lines, both lines are simultaneously grounded through the tube because all of the electrodes are located in a single cavity so that once the gas in the cavity ionizes, it provides a low resistance path to ground for all of the electrodes.

A U.S. Pat. No. 3,816,802 issued to Crask and Egerer describes gas filled discharge tubes containing step-up transformers for protecting signal lines.

One of the problems with existing lightning arresters is that they are usually very bulky and are for protection of two or less lines. The present invention, in contrast, provides a cylindrical housing with an insulating seal and a plurality of electrodes to protect against surge voltages on up to four lines and yet is substantially smaller than existing devices to enable the arrester to be conveniently installed in areas where there is little space.

SUMMARY OF THE INVENTION

Briefly, the present invention comprises a compact fail safe lightning arrester formed from a cylindrical cup in which a plurality of electrodes are located in a spaced relationship from a common conducting surface located on the inside of the cylindrical cup. A suitable gas, such as Argon, is sealed within the cup.

DESCRIPTION OF THE PREFERRED EMBODIMENT

Figure 1:
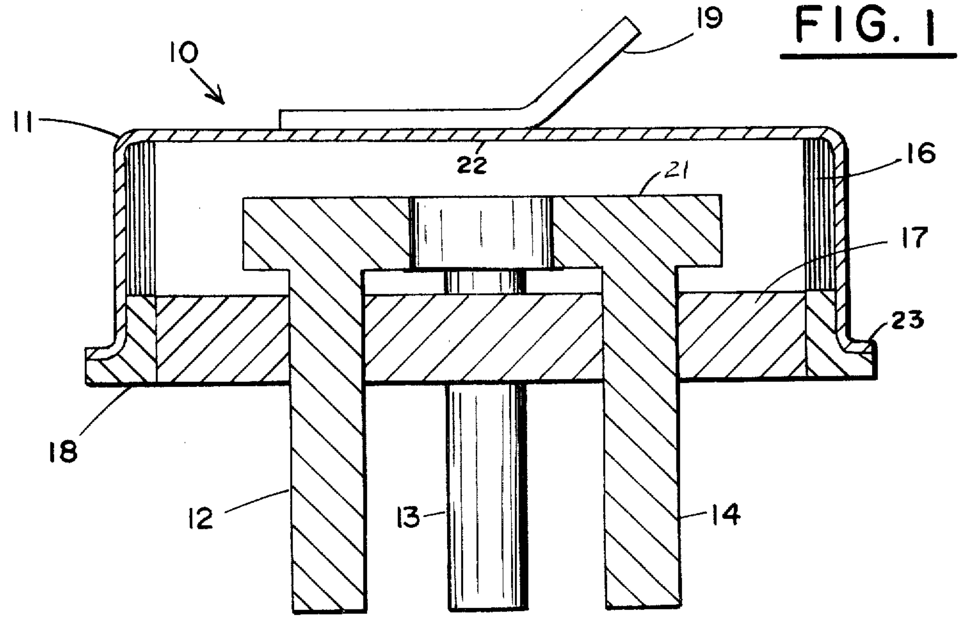
FIG. 1 illustrates a cross-section view of my lightning arrester.

Referring to FIG. 1, reference numeral 10 generally designates the lightning arrester of my invention. Lightning arrester 10 comprises a cylindrical cup-shaped conductor housing 11 having an electrode grounding tab 19 thereon. Housing 11 is substantially circular in shape with side walls located perpendicular to the housing and flange 23 located on the side walls of housing 11. Four conducting electrodes 12, 13, 14 and 15 are mounted in a cylindrical non-conducting disc 17 which is hermetically sealed to housing 11 by an annular sealing ring 18. Typically, cylindrical disc 17 is made from a ceramic, glass, or other non-conducting material while the electrodes are made from steel and the sealing ring 18 is made from steel.

Figure 2:
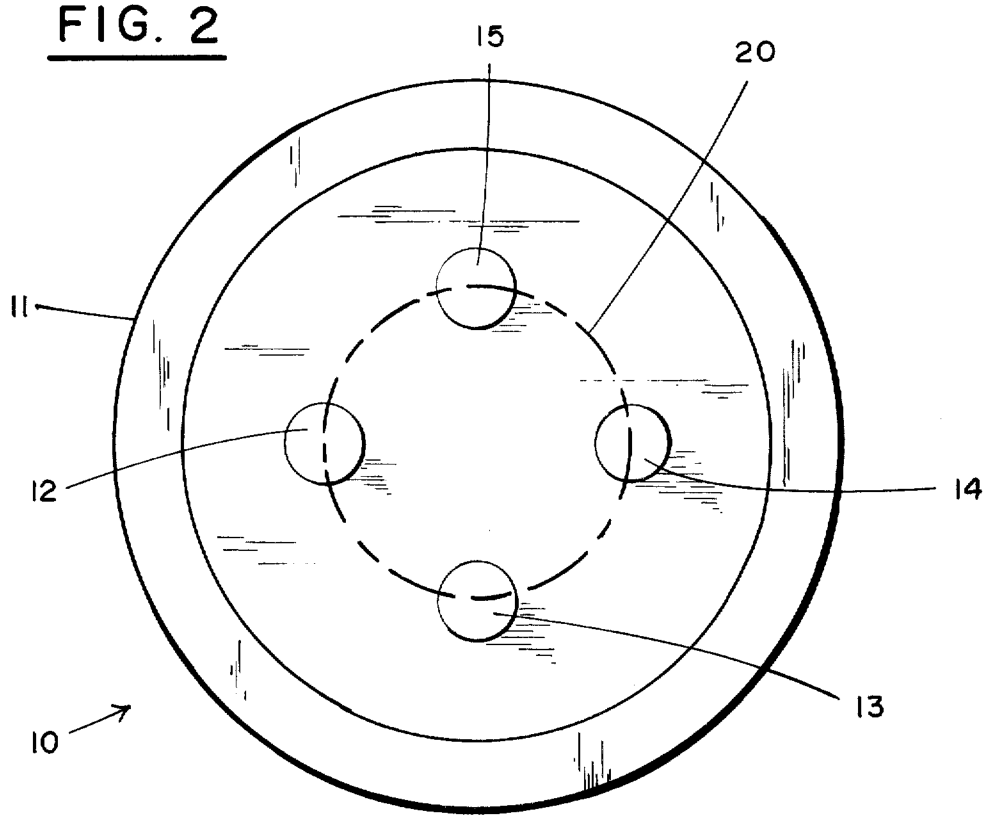
FIG. 2 illustrates a bottom view of my lightning arrester.

Referring to FIG. 2, the terminal portions of electrodes 12, 13, 14 and 15 are located outside of the cylindrical cup 11 for attachment to the lines to be protected from electrical surges. Electrodes 12, 13, 14 and 15 are located in a uniformly spaced relationship on a concentric circle 20.

Sealing ring 18 forms an air tight moisture proof seal between housing 11 and insulating member 17. Located above sealing ring 18 is a fusible electrically conducting material 16 that will melt at a temperature that is lower than the melting temperature of the other components of the arrester. When material 16 melts, it flows around the electrodes. However, this occurs only if a short should occur for a few seconds duration. Fusible material 16 may be solder which is normally 63% lead and 37% tin, or any other similar low melting electrically conductive material. When the fusible material melts, it provides a permanent grounding of all lines. Obviously, the unit must be replaced but, in the meantime, the equipment remains protected from any further high voltage surges. This feature is important if there should be a continuous short such as due to a power line falling across a telephone line during a storm. Normally, the high voltage must continue for at least a few seconds for the fusible material to melt and produce a permanent ground.

In the operation of conventional gas tubes when a potential level is reached, the gas ionizes causing electronic flow between the incoming electrode and ground. In the present invention, the incoming electrical surge would flow through either the electrodes 12, 13, 14 and 15 and cause the gas within housing 11 to ionize and thus allow the incoming surge to take the path of least resistance to ground. By determining the spacing and the type of gas used, the amount of voltage to provide ionization can be engineered into the lightning arrester. Typically, Argon gas, under a pressure of about 4 Torr, is used when the electrode spacing is 0.050 inches. However, the concept of controlling the threshold of discharge by controlling these three parameters is within the knowledge of those skilled in the art and is not part of the present invention.

In the present invention, a plurality of electrodes 12, 13, 14 and 15 are located in a spaced relationship from surface 22 of conducting housing 11. In the present embodiment, I provide an equal distance between the top of cylindrical housing 11 and between each of the electrodes 12, 13, 14 and 15, thus, it provides a large surface area for discharge of unwanted electrical energy.

Each of electrodes 12, 13, 14 and 15 have a top portion 21 which is larger than the terminal portion of the electrode that projects through the insulating layer. This has a dual purpose, the first is to provide as large a surface area as possible for contact with the gas and the second is to provide sufficient spacing of electrodes on the outside of the arrester so that one can easily attach the lead wires thereto. In an alternate embodiment of my invention, I roughen the surface of the electrode by machining or etching to increase the surface area in contact with the gas.

In operation of the present invention, electrode 12 can be connected directly to a signal line; electrode 13 can be connected to another line; electrode 14 can be connected to another signal line, and electrode 15 can be connected to a fourth signal line. The case or housing 11, which is the fifth electrode, can be connected to the grounded signal wire and to an electrical ground through terminal 19.

In the present invention, the lightning arrester can also be used with a step-up transformer or can be operated in the conventional manner to protect a four wire circuit or a simple two wire circuit. In each case, one would use the terminal connection 19 located on the case and as many electrodes as necessary.

I claim:

1. A lightning arrester for preventing electrical surges comprising:

a cylindrical conducting cup-shaped housing having a flat surface and a side wall extending from said flat surface, said side wall having an edge, said side wall further having an inner and outer surface, said cylindrical housing having an external lead for connecting to an external ground; an insulating member for mounting within said edge of said side wall; a sealing ring extending around said cylindrical housing and said insulating member so that said cylindrical housing and said insulating member coact to thereby provide a hermetically sealed chamber in said cylindrical housing; an inert gas located in said hermetically sealed chamber and operable for ionization upon application of an electrical surge; a plurality of at least four electrodes each having a flat surface, said plurality of electrodes extending through said insulating layer so that said flat surface of each of said electrodes is located in the sealed chamber of said cylindrical housing, said flat surface and said plurality of electrodes located in a parallel equally spaced relationship from said flat surface of said cylindrical conducting housing; each of said electrodes' flat surfaces being identical to the other surfaces of said electrodes; each of said flat surfaces being circular in diameter, said electrodes and said surfaces spaced on a circle which is concentric with said cylindrical housing and each of said electrodes spaced equal distance from one another so that an electrical surge from any of said electrodes will be discharged to the electrical ground due to ionization of the gas in the hermetically sealed chamber; a fusible material extending around the inner surface of said side wall, said fusible material operable for melting if a continuous current is sustained between any one of said flat surface of said electrodes and said flat surface of said cylindrical housing.

* * * * *